United States Patent
Kanda et al.

(10) Patent No.: US 11,840,210 B2
(45) Date of Patent: Dec. 12, 2023

(54) VEHICLE CONTROL SYSTEM

(71) Applicant: HONDA MOTOR CO., LTD., Tokyo (JP)

(72) Inventors: Ryoma Kanda, Tokyo (JP); Shinichi Uchiyama, Tokyo (JP); Masahiro Hirota, Tokyo (JP); Jasvin Patheja, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 17/574,045

(22) Filed: Jan. 12, 2022

(65) Prior Publication Data

US 2022/0219658 A1 Jul. 14, 2022

(30) Foreign Application Priority Data

Jan. 13, 2021 (JP) ................................. 2021-003384

(51) Int. Cl.
*B60T 8/24* (2006.01)
*B60T 8/171* (2006.01)

(52) U.S. Cl.
CPC .............. *B60T 8/246* (2013.01); *B60T 8/171* (2013.01); *B60T 2201/16* (2013.01); *B60T 2210/14* (2013.01); *B60T 2220/00* (2013.01); *B60T 2230/02* (2013.01); *B60T 2240/00* (2013.01); *B60T 2250/04* (2013.01)

(58) Field of Classification Search
CPC ...... B60T 8/246; B60T 8/171; B60T 2201/16; B60T 2210/14; B60T 2220/00; B60T 2230/02; B60T 2240/00; B60T 2250/04
See application file for complete search history.

(56) References Cited

U.S. PATENT DOCUMENTS

2006/0259225 A1* 11/2006 Ono ..................... G01P 3/446
701/70
2017/0166019 A1* 6/2017 Singh .................. B60C 23/0408
2020/0198637 A1 6/2020 Okubo et al.

FOREIGN PATENT DOCUMENTS

JP 2020100320 A 7/2020

* cited by examiner

*Primary Examiner* — Jacob M Amick
(74) *Attorney, Agent, or Firm* — Armstrong Teasdale LLP

(57) ABSTRACT

A control device includes an additional deceleration calculation unit that calculates an additional deceleration (Gxadd) to be applied to the vehicle based on the steering angle, a target control amount calculation unit that calculates the control amount for the vehicle behavior changing device based on the additional deceleration, a rough road level calculation unit that calculates a rough road level of a road based on a wheel speed, and a control amount correction unit that corrects the control amount based on the rough road level, the rough road level calculation unit being configured to correct the wheel speed so as to remove a change thereof caused by the cornering maneuver of the vehicle, and to calculate the rough road level by using the corrected wheel speed.

5 Claims, 13 Drawing Sheets

VEHICLE CONTROL SYSTEM

TECHNICAL FIELD

The present invention relates to a vehicle control system that shifts the load of the vehicle to the side of the front wheels in an early phase of a cornering maneuver for an improved handling of the vehicle.

BACKGROUND ART

In a known vehicle control system for improving the cornering performance of a vehicle, a braking force is generated in the front wheels at the start of a cornering operation, without regard to a braking operation of the vehicle operator, so that the load of the vehicle is shifted to the side of the front wheels. See JP2020-100320A, for instance. By moving the load of the vehicle to the side of the front wheels, the frictional force between the front wheels and the road surface is increased, and the resultant increase in the lateral force generated in the front wheels improves the cornering performance of the vehicle. This involves a suitable change in the attitude of the vehicle. The vehicle control system disclosed in JP2020-100320A is provided with multiple braking force generating devices including a brake device and a power plant, and reduces the frequency of employing the brake device by suitably selecting the device for generating the necessary braking force from the available braking force generating devices.

The vehicle control system of this prior art presupposes that the road surface on which the vehicle is traveling is flat in calculating the additional deceleration to be generated in the vehicle. Therefore, depending on the road surface condition, the additional deceleration that is calculated may turn out to be deficient or excessive.

For example, if a strong additional deceleration is generated in the vehicle while driving on a rough road, the pitching of the vehicle body will increase, so the suspension may bottom out (the damper cylinder is maximally shortened), and the ride quality may deteriorate. Further, when an additional decelerating force is generated by reducing the output torque of the power plant, the ride quality of the vehicle may be deteriorated due to the combination of the vibration caused by the power plant due to the torque fluctuation and the vibration caused by the road surface input.

The method for increasing the lateral force generated in the front wheels is not limited to applying an additional deceleration to the vehicle at the start of turning. For example, by increasing the damping force of the variable damping force damper, it is possible to rapidly transfer the load to the front wheel side by the steer drag, which is a component of the front wheel lateral force that is directed rearward. In this case, the stroke condition of the suspension differs greatly depending on whether the road is good or bad. Therefore, if the control command for the damping force variable damper designed for a good road is outputted when traveling on a bad road, the ride quality may be significantly impaired.

SUMMARY OF THE INVENTION

In view of such a problem of the prior art, a primary object of the present invention is to provide a vehicle control system that can change the attitude of a vehicle for an improved handling of the vehicle by increasing the lateral force of the front wheels in a manner corresponding to the road condition so that the ride quality of the vehicle is prevented from being impaired.

The object of the present invention can be accomplished by providing a vehicle control system (30), comprising: a vehicle behavior changing device (6, 22) configured to change a behavior of a vehicle (1) so as to shift a load of the vehicle to a side of front wheels (4A) thereof; a control device (31) that requests a control amount (Fbadd) for the vehicle behavior changing device at an initial stage of a cornering maneuver of the vehicle; and a vehicle state information acquisition device (33, 34) that acquires vehicle state information including a steering angle ($\delta$), and a wheel speed (Vw), wherein the control device includes an additional deceleration calculation unit (43) that calculates an additional deceleration (Gxadd) to be applied to the vehicle based on at least the steering angle, a target control amount calculation unit (45) that calculates the control amount for the vehicle behavior changing device based on the additional deceleration, a rough road level calculation unit (66) that calculates a rough road level (LR) of a road on which the vehicle travels based on the wheel speed, and a control amount correction unit (44) that corrects the control amount based on the rough road level, the rough road level calculation unit being configured to correct the wheel speed so as to remove a change thereof caused by the cornering maneuver of the vehicle, and to calculate the rough road level by using the corrected wheel speed.

Thereby, the rough road level is calculated by using the wheel speed which is corrected by the rough road level calculation unit so as to remove the amount of change due to cornering, so that the rough road level of the traveling road can be accurately calculated. As a result, the control amount for the vehicle behavior changing device can be appropriately corrected according to the rough road level.

Preferably, the control amount correction unit (44) is configured to correct the control amount so as to weaken the control amount when the rough road level is high.

Since the control amount for the vehicle behavior changing device is weakened on rough roads, the riding comfort is prevented from being impaired by the operation of the vehicle behavior changing device.

Preferably, the control device (31) further includes a slip ratio calculation unit (67) that calculates a slip ratio (S) based on the wheel speed, wherein the control amount correction unit (44) calculates a correction amount (K) for the control amount based on the rough road level, the control amount correction unit correcting the control amount by the calculated correction amount when the slip ratio is in a low slip state where the slip ratio is equal to or less than a predetermined threshold value (Sth), and by a previous value of the correction amount when the slip ratio is in a high slip state where the slip ratio is larger than the threshold value.

Since the wheel speed that fluctuates normally in relation to the road surface input fluctuates without regard to the road surface input in a high slip state, the rough road level cannot be calculated by using the wheel speed in a high slip state. According to this aspect of the present invention, in the case of a high slip state, the control amount is corrected by a previous value of the correction amount or the value obtained immediately before the onset of the high slip state, so that an appropriate control amount according to the rough road level can be requested for the vehicle behavior changing device.

Preferably, the control amount correction unit corrects the control amount by a previous value of the correction amount for a prescribed time period after a start of a low slip state following the high slip state.

Thereby, a sudden change in the correction amount following the transition from a high slip state to a low slip state can be avoided.

Preferably, the control amount correction unit calculates the correction amount for the control amount based on the rough road level, determines if the control amount based on the additional deceleration is being requested or not, and in the case where the control amount is being requested, the control amount correction unit corrects the control amount with a previous value of the correction amount.

If the correction amount for the control amount changes during a cornering maneuver, the driver may feel a discontinuity in the vehicle behavior during the cornering maneuver, and may experience some discomfort as a result. According to this aspect of the present invention, in the state where the control amount calculated based on the additional deceleration is being outputted at the initial stage of cornering maneuver, the correction amount is maintained at the previous value so that the driver is prevented from experiencing discomfort due to the vehicle behavior during the cornering maneuver.

The present invention thus provides a vehicle control system that can change the attitude of a vehicle for an improved handling of the vehicle by increasing the lateral force of the front wheels in a manner corresponding to the road condition so that the ride quality of the vehicle is prevented from being impaired.

BRIEF DESCRIPTION OF THE DRAWING(S)

DESCRIPTION OF THE PREFERRED EMBODIMENT(S)

A vehicle control system 30 according to an embodiment of the present invention is described in the following with reference to the appended drawings.

Figure 1:
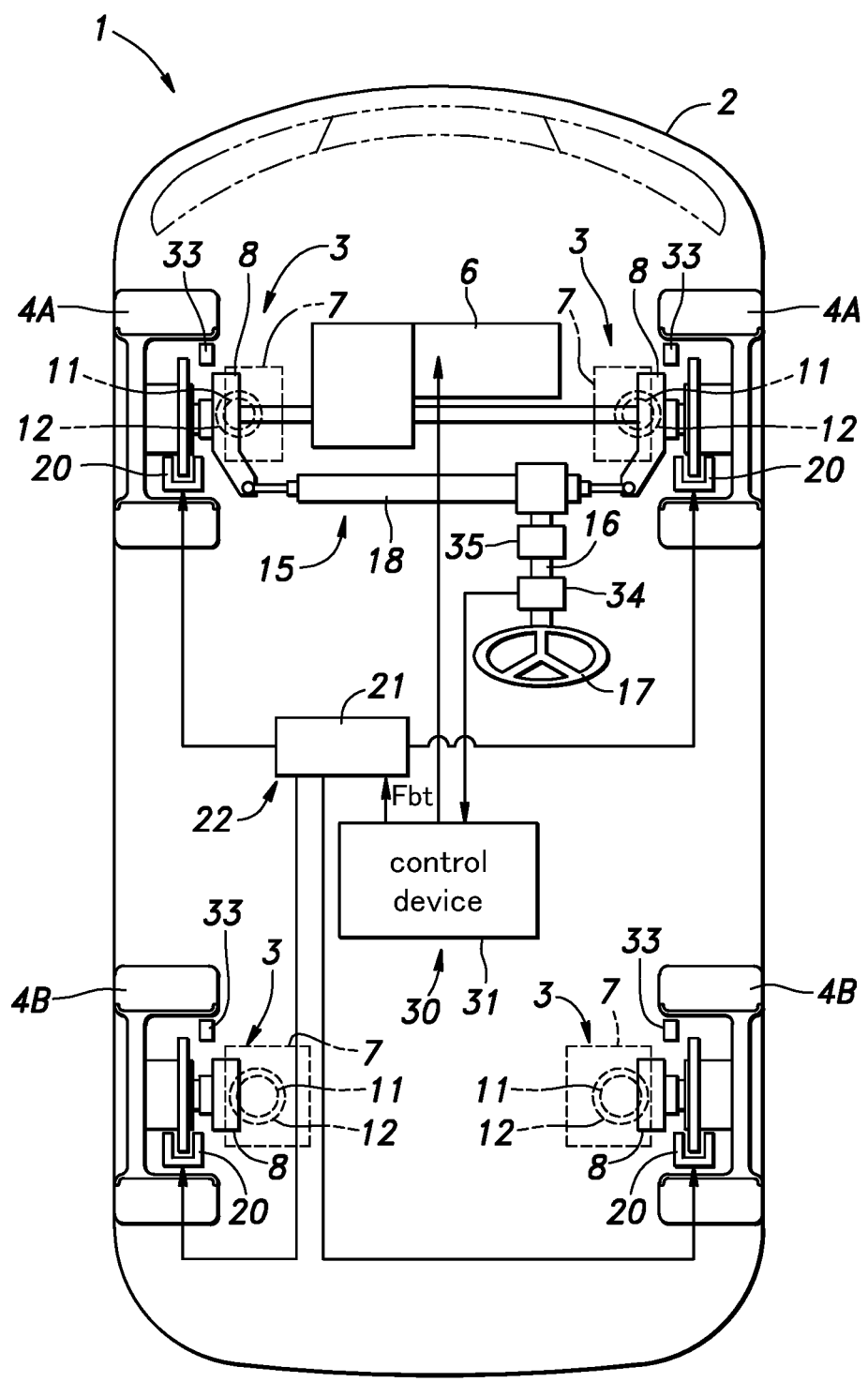
FIG. 1 is a block diagram of a vehicle equipped with a vehicle control system according to an embodiment of the present invention.

FIG. 1 is a schematic diagram of the structure of a vehicle 1 fitted with a vehicle control system 30 according to the present embodiment. As shown in FIG. 1, the vehicle 1 of this embodiment consists of a four-wheeled vehicle including a vehicle body 2 forming the structural frame of the vehicle 1 supporting a pair of front wheels 4A and a pair of rear wheels 4B via respective suspension devices 3.

The vehicle 1 is provided with a power plant 6 that drives the wheels 4 (4A, 4B). The power plant 6 may consist of at least one of an internal combustion engine such as a gasoline engine and a diesel engine and an electric motor. The vehicle 1 of the present embodiment is a front-wheel drive vehicle in which the power plant 6 is a gasoline engine and the driving force and braking force (rotational resistance) of the power plant 6 are transmitted to the front wheels 4A. The power plant 6 is a driving force generating device that generates the driving force that acts on the vehicle 1, and is also a braking force generating device that generates a braking force that acts on the vehicle 1. The power plant 6 is also a vehicle behavior modifying device that modifies the behavior of the vehicle 1 by generating a driving force or a braking force. Alternatively, the vehicle 1 may be a four-wheel drive vehicle or a rear-wheel drive vehicle.

Each suspension device 3 includes a suspension arm 7 pivotally supported by the vehicle body 2, a knuckle 8 supported by the suspension arm 7 to rotatably support the front wheel 4A or the rear wheel 4B, and a spring 11 and a damper 12 provided between the vehicle body 2 and the suspension arm 7. Each damper 12 may consist of a variable damping force damper. In this case, the damper may function as a vehicle behavior modifying device that modifies the behavior of the vehicle 1 by varying the damping force thereof.

The vehicle 1 is provided with a steering device 15 that steers the front wheels 4A. The steering device 15 includes a steering shaft 16 rotatably supported by the vehicle body 2 around an axis thereof, a steering wheel 17 provided at the upper end of the steering shaft 16, a pinion provided at the lower end of the steering shaft 16, and a rack 18 extending laterally and meshing with the pinion. The two ends of the rack 18 are connected to left and right knuckles 8 via tie rods, respectively. When the steering wheel 17 connected to the steering shaft 16 is turned, the rack 18 moves laterally in the corresponding direction, causing the front wheels 4A to be steered via the corresponding knuckles 8. Further, the steering shaft 16 is fitted with an electric motor that applies assist torque to the steering shaft 16 in response to a steering input from the driver.

Each of the front wheels 4A and the rear wheels 4B is provided with a brake device 20. The brake device 20 may consist of a disc brake device which is configured to generate a braking force on the corresponding wheel 4A, 4B by means of the oil pressure supplied from an oil pressure supply device 21. A brake system 22 is formed by the brake devices 20 of the different wheels and the oil pressure supply device 21. The brake system 22 is a braking force generating system that generates a braking force acting on the vehicle 1. The brake system 22 may function as a vehicle behavior modifying device that modifies the behavior of the vehicle 1 by applying a braking force to the vehicle 1. The oil pressure supply device 21 is configured to independently control the hydraulic pressure supplied to each brake device 20 so that the braking forces applied to the front wheels 4A and the rear wheels 4B of the brake system 22 can be changed independently of each other.

The vehicle 1 is provided with a vehicle control system 30 that controls the behavior of the vehicle 1. The vehicle control system 30 includes a control device 31 as a main part thereof. The control device 31 is essentially an electronic control circuit (ECU) composed of a microcomputer, ROM, RAM, a peripheral circuit, an input/output interface, various drivers, and the like. The control device 31 is connected to the power plant 6, the oil pressure supply device 21, and various sensors so as to be able to exchange signals via a communication means such as CAN (Controller Area Network).

The vehicle body 2 is provided with an accelerator pedal sensor that detects the amount of operation of the accelerator pedal and a brake pedal sensor that detects the amount of operation of the brake pedal. The control device 31 executes multiple control operations. In one of these control operations, a target braking force Fbt to be generated by the brake system 22 is calculated from the operation amount of the brake pedal, and an oil pressure supply device 21 is controlled according to the target braking force Fbt. In another control operation, the control device 31 controls the power plant 6 based on the operation amount of the accelerator pedal.

The control device 31 controls at least one of the brake system 22 and the power plant 6 to increase the lateral force of the front wheels 4A by shifting the load of the vehicle 1 to the side of the front wheels 4A at an early stage of a cornering operation without regard to the accelerator pedal operation or the brake pedal operation performed by the vehicle operator. More specifically, the control device 31 calculates an additional deceleration Gxadd to be added or applied to the vehicle 1 based on the vehicle state amounts representing the dynamic state of the vehicle 1 regardless of the driver's accelerator pedal operation and brake pedal operation, and controls at least one of the brake system 22 and the power plant 6 so as to generate an additional braking force Fbadd corresponding to the additional deceleration Gxadd. The vehicle state amounts include the vehicle speed V, which is the speed of the vehicle 1, the front wheel steering angle δ, which is the steering angle of the front wheels 4A, the front wheel steering angular velocity ω, which is the steering angular velocity of the front wheels 4A, a yaw rate r, which is an angular velocity of the vehicle 1 around a vertical axis passing through the gravitational center thereof, and the like.

The vehicle body 2 is provided with vehicle wheel speed sensors 33, a front wheel steering angle sensor 34, a front wheel steering angular velocity sensor 35 and a yaw rate sensor 36 as vehicle state amount detection devices. Each of the front wheels 4A and the rear wheels 4B is provided with the corresponding vehicle wheel speed sensor 33 which outputs a pulse signal generated in response to the rotation of the corresponding wheel 4A, 4B to the control device 31. The control device 31 acquires the wheel speeds Vw of the front wheels 4A and the rear wheels 4B based on the signals from the vehicle wheel speed sensors 33, and acquires the vehicle speed V by averaging the wheel speeds Vw of the different wheels. The vehicle speed V is acquired as a positive value when moving forward and as a negative value when moving backward.

The front wheel steering angle sensor 34 outputs a signal corresponding to the rotational angle of the steering shaft 16 (steering wheel steering angle) to the control device 31. The control device 31 converts the rotational angle input from the front wheel steering angle sensor 34 into a rotational angle of the front wheels 4A (front wheel steering angle), which are the steered wheels, by multiplying the steering wheel steering angle by a predetermined gear ratio, and acquires the front wheel steering angle δ. The front wheel steering angle δ is acquired as a positive value during a left turn operation and as a negative value during a right turn operation.

The front wheel steering angular velocity sensor 35 outputs a signal corresponding to the rotational angular velocity (steering wheel steering angular velocity) of the steering shaft 16 to the control device 31. The control device 31 converts the angular velocity input from the front wheel steering angular velocity sensor 35 into the steering angular velocity of the front wheels 4A (front wheel steering angular velocity), which are the steered wheels, by multiplying the angular velocity input from the front wheel steering angular velocity sensor 35 by a predetermined gear ratio, and acquires the front wheel steering angular velocity ω. The front wheel steering angular velocity ω is acquired as a positive value during a leftward turning operation and as a negative value during a rightward turning operation. The front wheel steering angular velocity ω is a time differentiated value of the front wheel steering angle δ and is represented by d/dt δ. Hereinafter, in mathematical formulas and drawings, d/dt may be represented by a dot placed above the variable. In this particular case, the front wheel steering angular velocity ω is obtained not a value calculated by time-differentiating the front wheel steering angle δ, but as a speed detection value corresponding to the angular velocity output from the front wheel steering angular velocity sensor 35.

In another embodiment, the front wheel steering angle sensor 34 detects the stroke of the rack 18 in the lateral direction, and the control device 31 multiplies the stroke input from the front wheel steering angle sensor 34 by a predetermined coefficient to obtain the front wheel steering angle δ. Further, it may be arranged such that the front wheel steering angular velocity sensor 35 detects the stroke speed of the rack 18 in the lateral direction, and the control device 31 multiplies the stroke speed input from the front wheel steering angle sensor 34 by a predetermined coefficient to obtain the steering angular velocity of the front wheels 4A. The front wheel steering angular velocity is thus detected as a value corresponding to the linear stroke velocity of the rack 18.

The yaw rate sensor 36 forwards a signal corresponding to the yaw rate r given as an angular velocity of the vehicle around the vertical axis passing through the gravitational center thereof to the control device 31. The control device 31 acquires the yaw rate r according to the signal from the yaw rate sensor 36. The yaw rate is a positive value when the vehicle 1 is making a left turn (counterclockwise rotation as seen from above), and a negative value when the vehicle 1 is making a right turn (clockwise rotation as seen from above).

The control device 31 serves as a vehicle speed acquisition device that acquires the vehicle speed V in cooperation with the vehicle wheel speed sensors 33, a front wheel steering angle acquisition device that acquires the front wheel steering angle δ in cooperation with the front wheel steering angle sensor 34, a front wheel steering angular velocity acquisition device that acquires the front wheel steering angular velocity ω in cooperation with the front wheel steering angular velocity sensor 35, and a yaw rate acquisition device that acquires the yaw rate r in cooperation with the yaw rate sensor 36.

Figure 2:
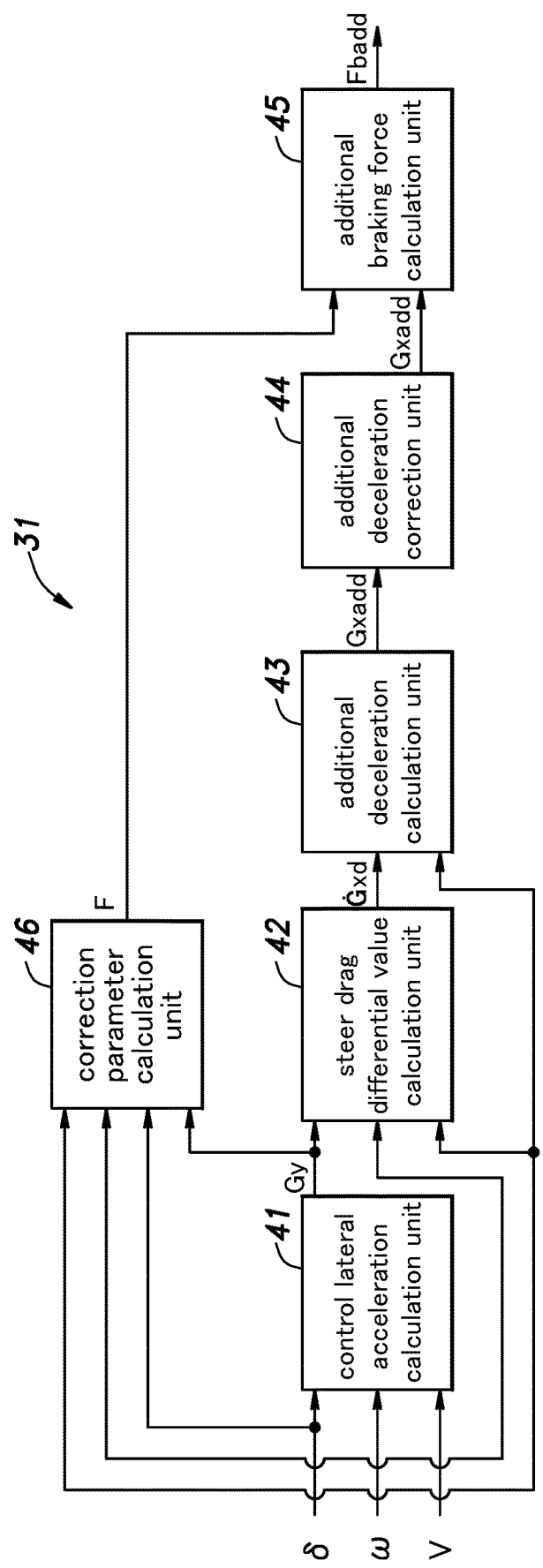
FIG. 2 is a functional block diagram of a control device included in the vehicle control system.

As shown in FIG. 2, the control device 31 includes a control lateral acceleration calculation unit 41, a steer drag differential value calculation unit 42, an additional deceleration calculation unit 43, an additional deceleration correction unit 44, an additional braking force calculation unit 45, and a correction parameter calculation unit 46. The correction parameter calculation unit 46 is a functional unit that calculates a correction parameter for correcting the additional deceleration Gxadd so as to correspond to the road surface condition and the traveling condition of the vehicle 1 according to the vehicle state amounts.

The control lateral acceleration calculation unit 41 calculates a control lateral acceleration Gy used for an additional deceleration control (which will be discussed hereinafter) based on the front wheel steering angle δ, the front wheel steering angular velocity ω, and the vehicle speed V. The steer drag differential value calculation unit 42 calculates a steer drag differential value d/dt GxD obtained by time differentiating a steer drag GxD, which is a component of the lateral force of the front wheels 4A directed rearward of the vehicle 1, obtained from the control lateral acceleration Gy, the front wheel steering angle δ, and the front wheel steering angular velocity ω. The additional deceleration calculation unit 43 calculates an additional deceleration Gxadd to be applied to the vehicle 1 according to the steer drag differential value d/dt GxD.

The additional deceleration correction unit 44 corrects the additional deceleration Gxadd according to correction parameters (a rough road level LR and a slip ratio S which will be discussed hereinafter) calculated by the correction parameter calculation unit 46. The additional braking force calculation unit 45 calculates the additional braking force Fbadd to be generated in the power plant 6 and/or the brake system 22 based on the corrected additional deceleration Gxadd. The additional deceleration correction unit 44 corrects the additional braking force Fbadd (which is calculated from the corrected additional deceleration Gxadd) by correcting the additional deceleration Gxadd.

By operating these functional units, the control device 31 executes an additional deceleration control to generate a braking force acting on the vehicle 1 from the power plant 6 and/or the brake system 22. The control device 31 causes the load of the vehicle 1 to be shifted to the side of the front wheels 4A by executing the additional deceleration control so as to generate the additional deceleration Gxadd.

In this way, the control device 31 calculates the additional braking force Fbadd based on the front wheel steering angle δ, the front wheel steering angular velocity ω and the vehicle speed V, and executes the additional deceleration control whereby the braking force to be applied to the vehicle 1 is generated by the power plant 6 and/or the brake system 22. This control process is executed by the control device 31 without using the actual lateral acceleration of the vehicle 1 detected by a lateral acceleration sensor. As a result, the control lateral acceleration Gy can be advanced in phase with respect to the actual lateral acceleration so that the additional deceleration Gxadd can be generated in the vehicle 1 earlier than when the actual lateral acceleration is used. Therefore, it is possible to reduce a time delay of the additional deceleration Gxadd that could be caused by the communication delay in acquiring the sensor information, the communication delay of the target braking force information, and the response delay of the braking force generator.

Figure 3:
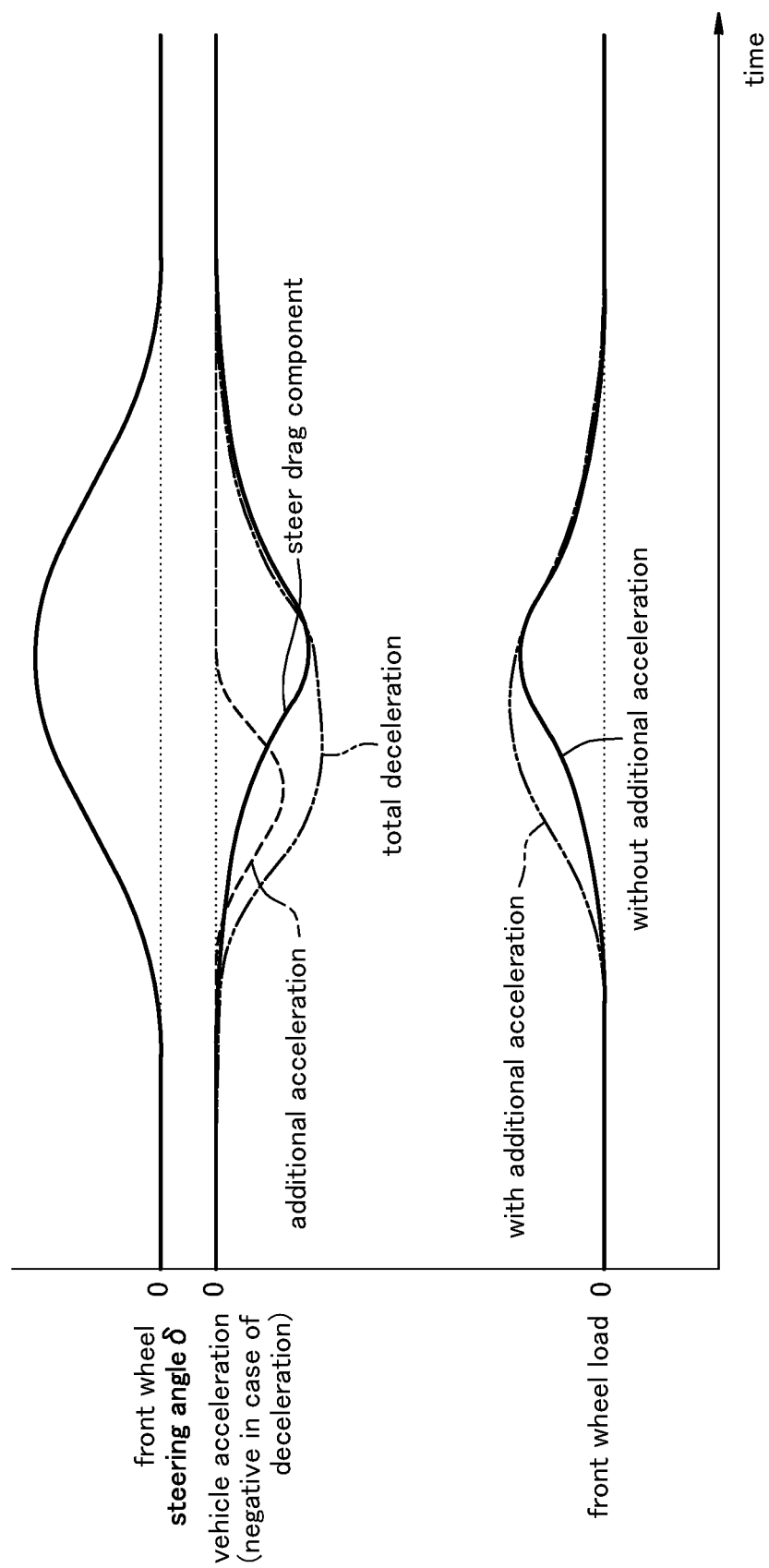
FIG. 3 is a time chart showing a mode of operation of the control device.

FIG. 3 is a time chart showing the working principle of the additional deceleration control executed by the control device 31. As shown in FIG. 3, when the steering wheel 17 is operated and the front wheel steering angle δ increases, a traveling resistance (steer drag GxD) is created in the front wheels 4A, and as shown by the solid lines, the vehicle 1 decelerates by an amount corresponding to the amount of the steer drag (due to this steer drag GxD). The deceleration of the vehicle 1 causes the front wheel load of the vehicle 1 to be increased in a corresponding amount. The deceleration of the vehicle 1 or the increase in the front wheel load corresponding to the steer drag occurs with some time delay relative to the increase of the front wheel steering angle δ. Thus, there is some response delay between the steering of the front wheels 4A and the resultant increase in the steer drag.

On the other hand, the steer drag differential value d/dt GxD is advanced in phase relative to the steer drag GxD by 90°. Therefore, when the additional deceleration calculation unit 43 calculates the additional deceleration Gxadd based on the steer drag differential value d/dt GxD, and the control device 31 generates the additional braking force Fbadd based on this calculated steer drag differential value d/dt GxD, the additional deceleration Gxadd is additionally applied to the vehicle 1 in such a manner that the total deceleration of the vehicle 1 is advanced in phase relative to the deceleration component due to the steer drag as shown by the imaginary line in FIG. 3. As a result, the front wheel load starts increasing with an advanced phase as compared with the case where no additional deceleration Gxadd is applied so that the cornering performance of the vehicle 1 is improved.

Figure 4:
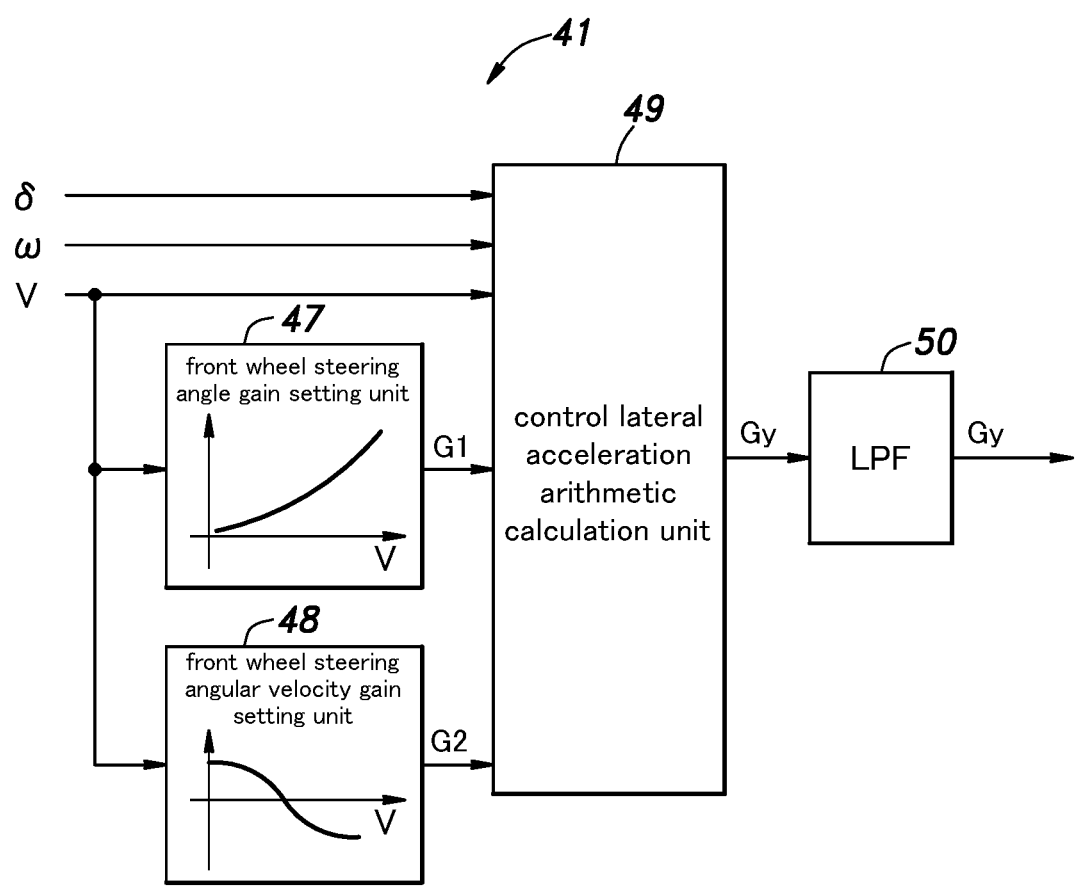
FIG. 4 is a functional block diagram of a control lateral acceleration calculation unit of the control device.

As shown in FIG. 4, the control lateral acceleration calculation unit 41 includes a front wheel steering angle gain setting unit 47, a front wheel steering angular velocity gain setting unit 48, a control lateral acceleration arithmetic calculation unit 49, and a low-pass filter (hereinafter referred to as LPF 50). The front wheel steering angle gain setting unit 47 sets a front wheel steering angle gain G1 which is a first correction value with respect to the front wheel steering angle δ used for calculating the control lateral acceleration Gy based on the vehicle speed V. The front wheel steering angular velocity gain setting unit 48 sets a front wheel steering angular velocity gain G2 which is a second correction value for the front wheel steering angular velocity ω used for calculating the control lateral acceleration Gy based on the vehicle speed V. The control lateral acceleration arithmetic calculation unit 49 calculates the control lateral acceleration Gy based on the front wheel steering angle δ, the front wheel steering angular velocity ω, the front wheel steering angle gain G1, and the front wheel steering angular velocity gain G2.

The front wheel steering angle gain setting unit 47 is provided with a front wheel steering angle gain map defining the relationship between the vehicle speed V and the front wheel steering angle gain G1 such that the desired characteristics of the responsiveness of the lateral acceleration to the front wheel steering angle δ, which changes according to the vehicle speed V, may be achieved. The front wheel steering angle gain setting unit 47 extracts a value corresponding to the vehicle speed V from the front wheel steering angle gain map, and sets the extracted value as the front wheel steering angle gain G1.

The front wheel steering angular velocity gain setting unit 48 is provided with a front wheel steering angular velocity gain map defining the relationship between the vehicle speed V and the front wheel steering angular velocity gain G2 such that the desired characteristics of the responsiveness of the lateral acceleration to the front wheel steering angular velocity ω, which changes according to the vehicle speed V, may be achieved. The front wheel steering angular velocity gain setting unit 48 extracts a value corresponding to the vehicle speed V from the front wheel steering angular velocity gain map, and sets the extracted value as the front wheel steering angular velocity gain G2.

The control lateral acceleration arithmetic calculation unit 49 calculates the control lateral acceleration Gy by calculating Equation (1) given below:

$$G_y = G1 \cdot \delta + G2 \cdot \omega \quad (1)$$

Thus, the control lateral acceleration arithmetic calculation unit 49 calculates the first multiplication value (the first term of Equation (1)) by multiplying the front wheel steering angle δ by the front wheel steering angle gain G1 which is the first correction value based on the vehicle speed V, calculates the second multiplication value (the second term of Equation (1)) by multiplying the front wheel steering angular velocity ω by the front wheel steering angular velocity gain G2, which is the second correction value based on the vehicle speed V, and calculates the control lateral acceleration Gy by adding the first multiplication value and the second multiplication value to each other. By calculating the control lateral acceleration Gy in this way by using the control lateral acceleration calculation unit 41, the contribution of the control lateral acceleration Gy to the lateral acceleration of the vehicle 1 is caused to change with the vehicle speed V in such a manner that the response of the actual lateral acceleration to the steering operation changes with the vehicle speed V in an optimum fashion.

When calculating the control lateral acceleration Gy, the control lateral acceleration arithmetic calculation unit 49 uses the front wheel steering angular velocity ω acquired from the front wheel steering angular velocity sensor 35, instead of the time differential value of the front wheel steering angle δ acquired from the front wheel steering angle sensor 34. Thereby, Equation (1) used for calculating the control lateral acceleration Gy is prevented from being one of a higher order.

The LPF 50 performs a low-pass filter process on the control lateral acceleration Gy calculated by the control lateral acceleration arithmetic calculation unit 49. As a result, the increase in the high frequency gain is suppressed so that undue fluctuations of the control lateral acceleration Gy in a high frequency region is prevented, and the noise in the control lateral acceleration Gy is substantially eliminated. By performing the low-pass filter process on the control lateral acceleration Gy by using the control lateral acceleration calculation unit 41 in this way, it becomes possible to apply a stable braking force to the vehicle 1.

Equation (1) is based on an approximation consisting of ignoring or disregarding the second order delay component and the differential component in the equation for the control lateral acceleration Gy of a conventional planar two degrees of freedom model of the vehicle 1. The control lateral acceleration arithmetic calculation unit 49 calculates the control lateral acceleration Gy by using Equation (1) based on the front wheel steering angle δ, the front wheel steering angular velocity ω, and the vehicle speed V in this way. Therefore, the phase of the control lateral acceleration Gy can be advanced as compared with the conventional technique of calculating the control lateral acceleration Gy by using a planar two degrees of freedom model, and the additional deceleration Gxadd can be generated in the vehicle 1 at an early stage.

Figure 5:
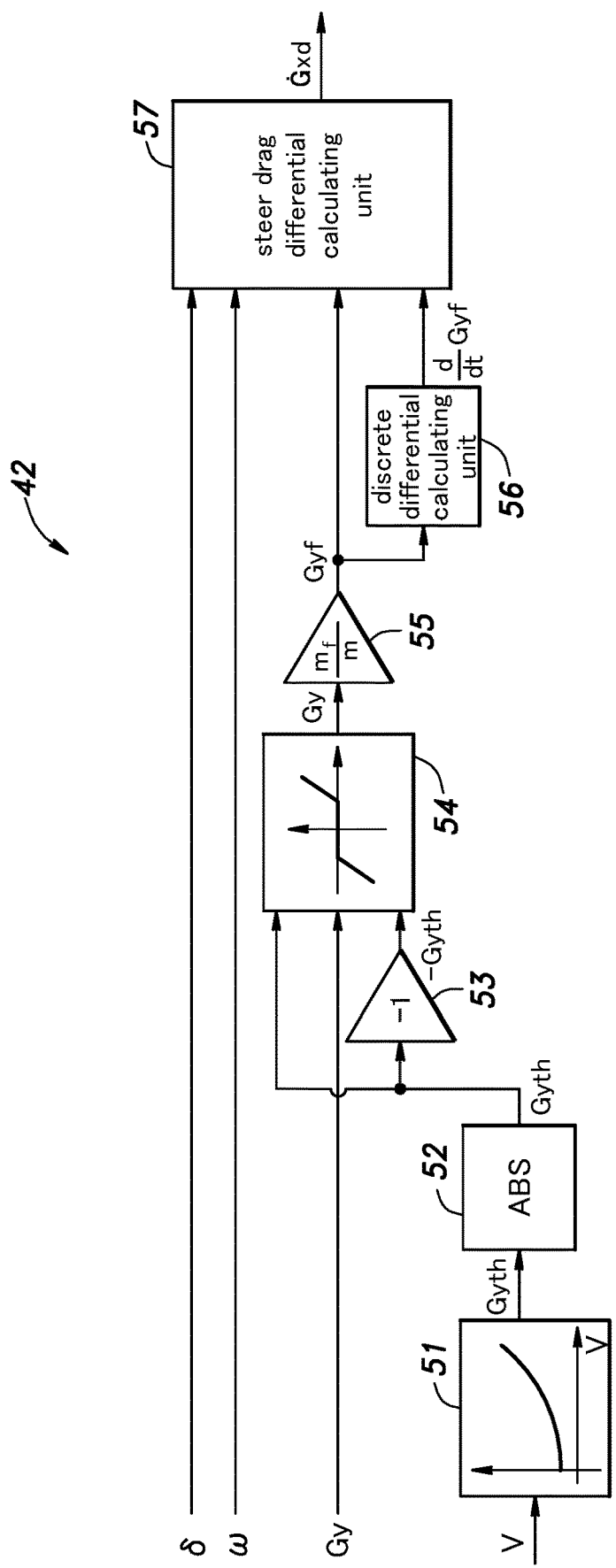
FIG. 5 is a functional block diagram of a steer drag differential value calculation unit.

FIG. 5 is a functional block diagram of the steer drag differential value calculation unit 42. As shown in FIG. 5, the steer drag differential value calculation unit 42 includes a dead zone threshold value setting unit 51, an absolute value calculation unit 52, a negative value calculation unit 53, a dead zone processing unit 54, a control lateral acceleration front wheel component calculation unit 55, a discrete differential calculation unit 56, and a steer drag differential value arithmetic calculation unit 57.

The dead zone threshold value setting unit 51 sets a threshold value Gyth to be used for the dead zone process for the control lateral acceleration Gy according to the vehicle speed V. More specifically, the dead zone threshold value setting unit 51 sets the threshold value Gyth to a positive value which gets larger with a higher vehicle speed V. The absolute value calculation unit 52 calculates the absolute value of the threshold value Gyth set by the dead zone threshold value setting unit 51. Since the dead zone threshold value setting unit 51 sets a positive value to the threshold value Gyth, the absolute value calculation unit 52 outputs the threshold value Gyth as it is. The negative value calculation unit 53 multiplies the threshold value Gyth by −1 to convert the threshold value Gyth to a negative value, and outputs the converted negative value threshold value −Gyth.

The dead zone processing unit 54 performs a dead zone process on the control lateral acceleration Gy by using the positive threshold value Gyth and the negative value threshold value −Gyth. More specifically, when the absolute value of the inputted control lateral acceleration Gy is equal to or less than the threshold value Gyth (|Gy|≤Gyth), the dead zone processing unit 54 outputs 0 as the control lateral acceleration Gy as the dead zone process, and when the absolute value of the inputted control lateral acceleration Gy is larger than the threshold value Gyth (|Gy|>Gyth), the absolute value of the control lateral acceleration Gy is reduced by the threshold value Gyth, and this reduced value is outputted as the control lateral acceleration Gy as the dead zone processing.

By performing the dead zone process in this way, the dead zone processing unit 54 outputs 0 as the control lateral acceleration Gy in the dead zone region where the absolute value is equal to or less than the predetermined threshold value Gyth. Therefore, in the dead zone region, no additional deceleration Gxadd is generated so that the vehicle behavior is the same as that of the base vehicle on which the vehicle control system 30 is mounted. Therefore, in the range of the front wheel steering angle δ where the vehicle travels substantially straight ahead (the dead zone region), the steering reaction force is the same as that of the base vehicle, and the vehicle 1 maintains the same responsiveness as the base vehicle. In this operating condition, since the frequency of occurrence of the additional braking force Fbadd decreases, the decrease in the durability of the brake system 22 and the brake lamp is not adversely affected. Further, in the operating range corresponding to this control dead zone, since the additional braking force Fbadd does not act on the vehicle 1 in the range where the front wheel steering angle δ is small, the operation of the vehicle control system 30 is prevented from interfering with the operation of other functional devices that are configured to operate when the vehicle is traveling straight ahead. On the other hand, when the control lateral acceleration Gy starts exceeding the predetermined threshold value Gyth, the control lateral acceleration is outputted as a continuous value increasing from 0 following the dead zone process. Therefore, the additional deceleration Gxadd increases gradually so that the cornering performance of the vehicle 1 can be improved while maintaining a smooth vehicle behavior.

The control lateral acceleration front wheel component calculation unit 55 multiplies the control lateral acceleration Gy which has been subjected to the dead zone processing by a front axle mass ratio mf/m (which is the ratio of the front axle mass mf to the vehicle mass m) to calculate a control lateral acceleration front wheel component Gyf_z which is the front wheel component of the control lateral acceleration Gy. The discrete differential calculation unit 56 differentiates the control lateral acceleration front wheel component Gyf to calculate the control lateral acceleration front wheel component differential value d/dt Gyf. The steer drag differential value arithmetic calculation unit 57 calculates the steer drag differential value d/dt G×D (=d/dt (Gyf·δ)), which is the differential value of the steer drag G×D (=Gyf·δ), from the front wheel steering angle δ, the front wheel steering angular velocity ω, the control lateral acceleration front wheel component Gyf and the control lateral acceleration front wheel component differential value d/dt Gyf by using Equation (2) given in the following.

$$\frac{d}{dt}(G_{yf} \cdot \delta) = \frac{d}{dt}(G_{yf}) \cdot \delta + G_{yf} \cdot \dot{\delta} \qquad (2)$$

Figure 6:
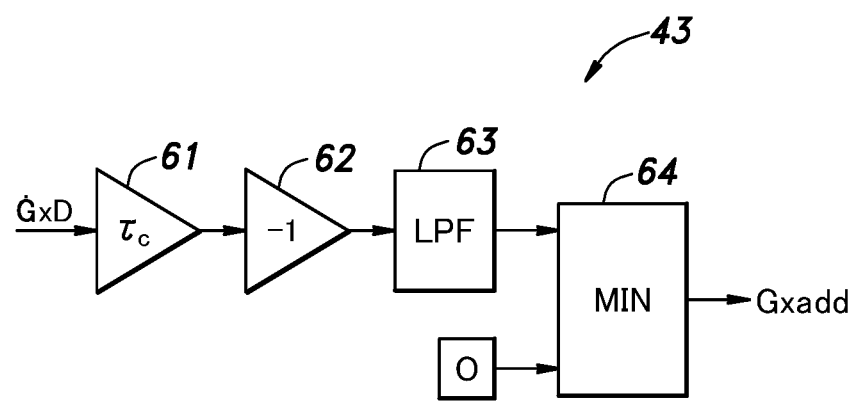
FIG. 6 is a functional block diagram of an additional deceleration calculation unit.

FIG. 6 is a functional block diagram of the additional deceleration calculation unit 43. As shown in FIG. 6, the additional deceleration calculation unit 43 includes an advance time constant multiplication unit 61, a negative value calculation unit 62, an LPF 63 (low-pass filter), and a low value selection unit 64.

The advance time constant multiplication unit 61 multiplies the steer drag differential value d/dt G×D by an advance time constant τc. As a result, the magnitude of the steer drag differential value d/dt G×D, which is the basis for calculating the additional deceleration Gxadd shown in FIG. 3, is changed so that the degree of phase advance with respect to the deceleration of the steer drag of the total deceleration is adjusted. The negative value calculation unit 62 converts the product of the steer drag differential value d/dt G×D and the advance time constant τc into a negative value by multiplying −1 to the product so that the fore and aft acceleration generated in the vehicle 1 becomes a negative value (deceleration). The LPF 63 performs a low-pass filter process on the value converted into the negative value by the negative value calculation unit 62. As a result, the increase in the high frequency gain is suppressed so that the fluctuations of the additional deceleration Gxadd in the high frequency region is suppressed, and noise is removed. The low value selection unit 64 compares the value output from the LPF 63 with 0, selects a lower value to be outputted as the additional deceleration Gxadd. The additional deceleration Gxadd outputted from the low value selection unit 64 is a value equal to or smaller than 0.

As shown in FIG. 2, the additional deceleration Gxadd output that is outputted from the additional deceleration calculation unit 43 is subjected to an appropriate correction process by the additional deceleration correction unit 44. The details of the correction process will be discussed in greater detail hereinafter. The corrected additional deceleration Gxadd that is outputted from the additional deceleration correction unit 44 is used by the additional braking force calculation unit 45 to calculate the additional braking force Fbadd. The control device 31 adds the additional braking force Fbadd output from the additional braking force calculation unit 45 to the target braking force Fbt, and causes the power plant 6 and/or the brake system 22 to generate the combined target braking force. As a result, as shown in FIG. 3, a deceleration given as a combination of the additional deceleration Gxadd and the deceleration due to the steer drag is generated in the vehicle 1 so that the cornering performance of the vehicle 1 is improved.

The details of the correction process performed on the additional deceleration Gxadd by the additional deceleration correction unit 44 will be discussed in the following. The calculation of the correction parameter is discussed first, and then the additional deceleration correction process is discussed.

Figure 7:
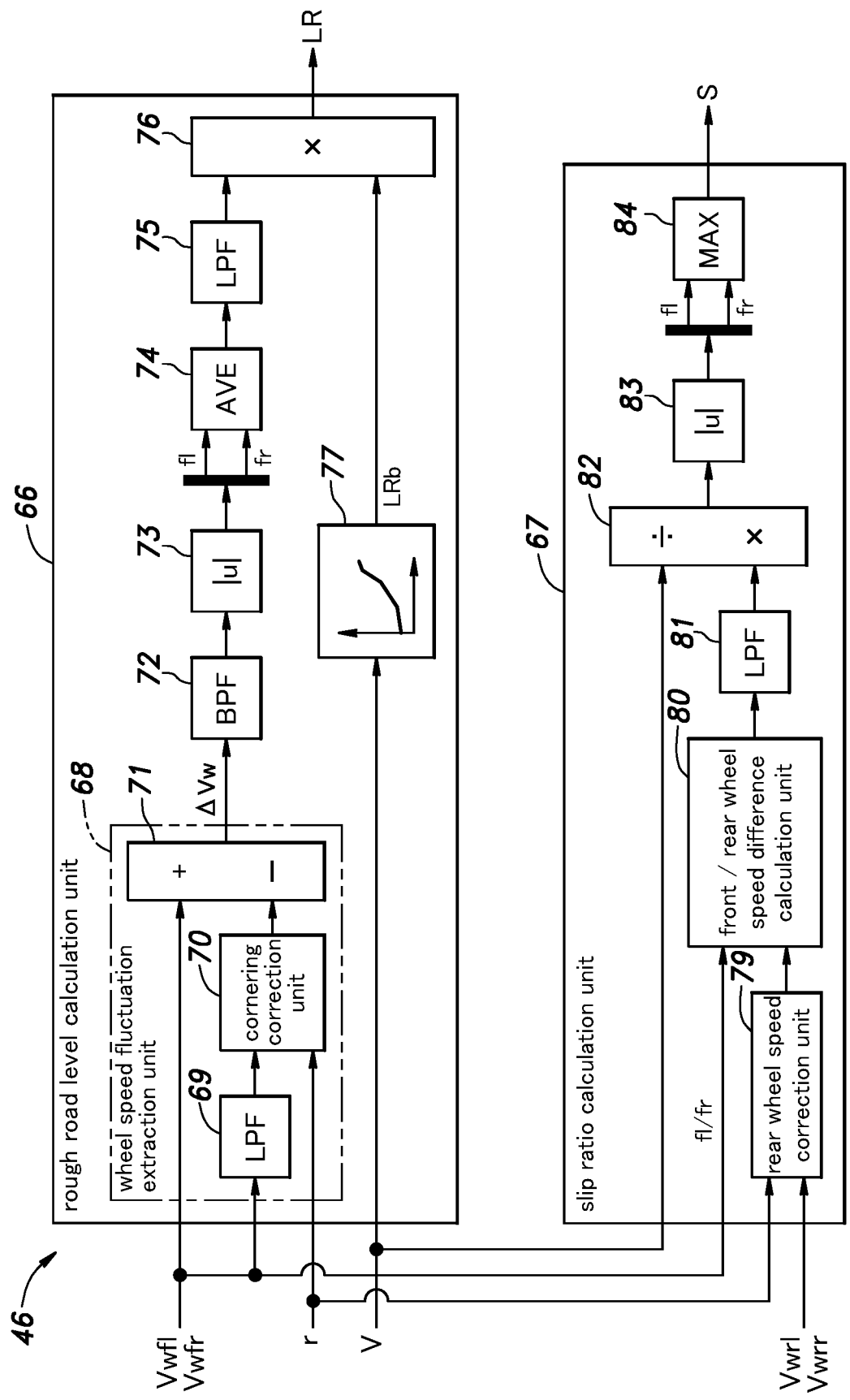
FIG. 7 is a functional block diagram of a correction parameter calculation unit.

FIG. 7 is a functional block diagram of the correction parameter calculation unit 46. The correction parameter calculation unit 46 includes a rough road level calculation unit 66 that calculates the rough road level LR of the road on which the vehicle is traveling, and a slip ratio calculation unit 67 that calculates the slip ratio S. The rough road level LR is an index of road surface irregularities, and is greater in value as the road surface irregularities become more severe, and lower in value as the road surface becomes flatter or smoother. The slip ratio S is calculated as a ratio of the apparent slip speed of the tire to the wheel speed Vw. The apparent slip speed of the tire is calculated as the absolute value of the difference between the wheel speed Vw and the vehicle speed V. Therefore, the slip ratio S is calculated as a positive value both during driving and during braking. In the present embodiment, the apparent slip speed of the tire is calculated as an absolute value of a difference obtained by subtracting the wheel speed Vw of the front wheel 4A from the wheel speed Vw of the rear wheel 4B on each side as will be described hereinafter.

The rough road level calculation unit 66 executes a rough road level calculation process for calculating the rough road level LR based on the wheel speeds Vw of the front wheels 4A, the yaw rate r, and the vehicle speed V. The rough road level calculation process will be described in detail in the following.

In the rough road level calculation unit 66, a wheel speed fluctuation extraction unit 68 extracts the wheel speed fluctuations ΔVw caused by the road surface input from the wheel speeds Vw of the left and right front wheels 4A. More specifically, the wheel speed fluctuation extraction unit 68 subtracts the acceleration/deceleration component and the steering component from the wheel speeds Vw of the front wheels 4A inputted from the wheel speed sensors 33 to extract the wheel speed fluctuations ΔVw solely due to the road surface input.

The wheel speed fluctuation extraction unit 68 may extract the wheel speed fluctuations ΔVw by the following method, for example. Specifically, in the wheel speed fluctuation extraction unit 68, the LPF69 (low-pass filter) filters the wheel speed Vw of each front wheel 4A to obtain a value approximately equal to the vehicle body speed that does not include the road surface input component. Each wheel speed Vw after the filter process is converted into a vehicle body speed at the position of the corresponding front wheel 4A by a cornering correction unit 70. In particular, the cornering correction unit 70 calculates the turning radius and the vehicle body speed at the front wheel axle center position based on the wheel speeds Vw of the right and left front wheels 4A, the yaw rate r, the wheel base and the tread. By multiplying the turning radius ratio at the position of each front wheel 4A to the vehicle body speed at the front wheel axle center position, the vehicle body speed at the position of the corresponding front wheel 4A is calculated. In the wheel speed fluctuation extraction unit 68, a subtractor 71 subtracts the vehicle body speed at the position of each front wheel 4A from the wheel speed Vw of the corresponding front wheel 4A inputted from the wheel speed sensor 33 to extract the wheel speed fluctuation ΔVw solely due to the road surface input.

The extraction process for the wheel speed fluctuations ΔVw due to the road surface input is performed by the wheel speed fluctuation extraction unit 68 in this embodiment, but the present invention is not limited to this embodiment. Other approaches such as those disclosed in JP2015-47907A and JP2016-22830A may also be used.

The wheel speed fluctuation ΔVw caused by the road surface input and extracted by the wheel speed fluctuation extraction unit 68 is filtered by a band-pass filter (hereinafter referred to as BPF 72). The BPF 72 may have a band-pass characteristic that allows the frequency component that affects the ride comfort to pass through. The wheel speed fluctuation ΔVw filtered by the BPF 72 is converted into an absolute value by an absolute value calculation circuit 73. The front wheel speed fluctuations ΔVw of the right and left front wheels 4A outputted from the absolute value calculation circuit 73 are converted into an average value by an average value circuit 74 so that it can be used as an input value to the vehicle 1, and is filtered or smoothed by an LPF 75 (low-pass filter) before being inputted to a multiplier 76.

The vehicle speed V inputted to the rough road level calculation unit 66 is converted into a rough road level base value LRb by a rough road level base value setting unit 77. The rough road level base value setting unit 77 is provided with a rough road level conversion map, and forwards the rough road level base value LRb corresponding to the vehicle speed V to a multiplier 76. The multiplier 76 calculates the rough road level LR of the traveling road by multiplying the rough road level base value LRb to the wheel speed fluctuation ΔVw due to the road surface input.

In this way, the rough road level calculation unit 66 corrects the wheel speeds Vw so as to remove the component due to cornering, and calculates the rough road level LR by using the corrected wheel speeds Vw. Therefore, the rough road level LR of the traveling road can be calculated accurately. As a result, the additional deceleration Gxadd generated in the power plant 6 and/or the brake system 22 is appropriately corrected according to the rough road level LR.

Figure 8:
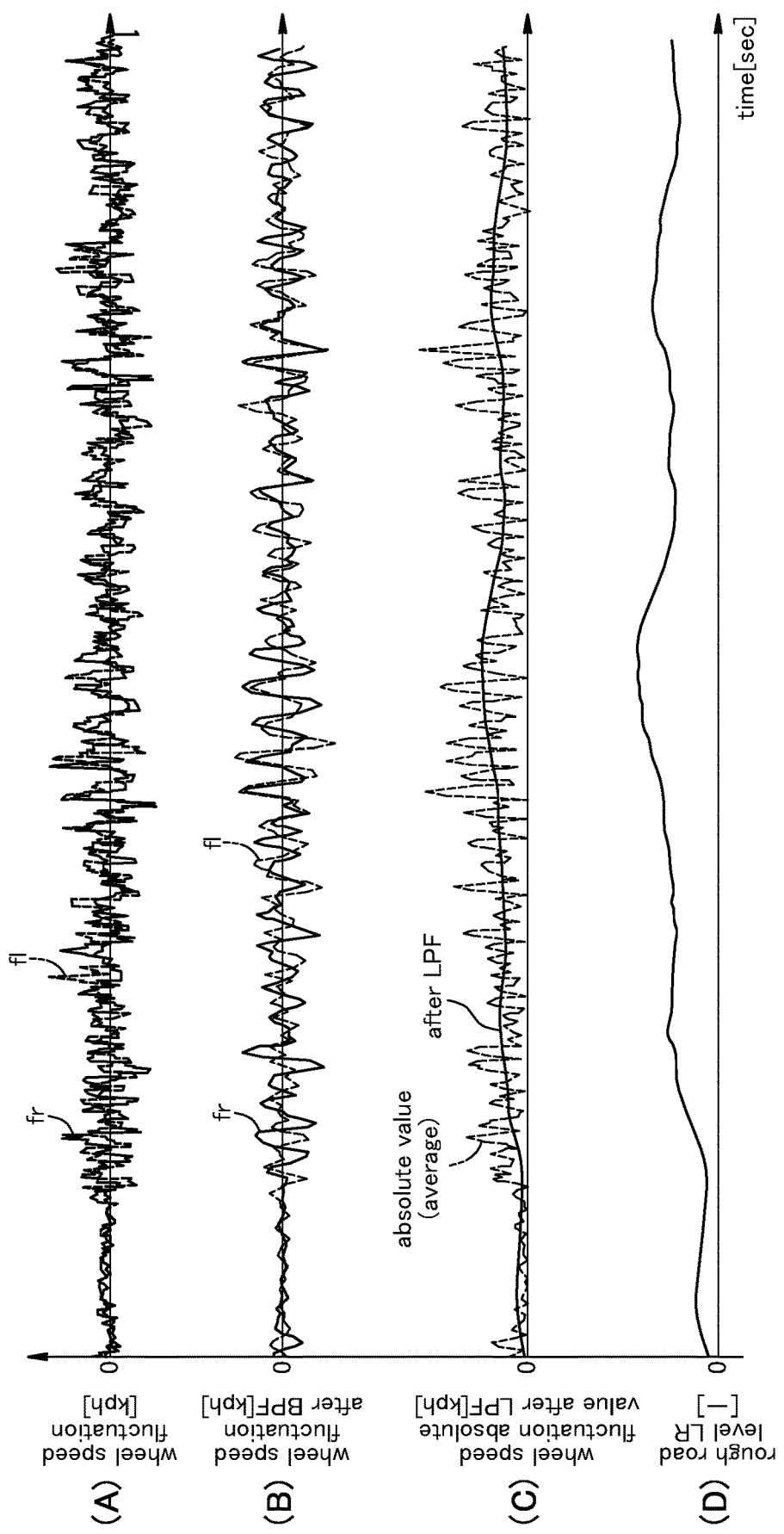
FIG. 8 is a time chart showing the changes in various variables in a rough road level calculation process.

FIG. 8 is a time chart showing various variables involved in the rough road level calculation process in an example where the vehicle is traveling on a Belgian road (cobblestone road). In the graph, "fr" denotes the right front wheel 4A, and "fl" denotes the left front wheel 4A. (A) in FIG. 8 shows the wheel speed fluctuations ΔVw of the left and right front wheels 4A outputted from the wheel speed fluctuation extraction unit 68 shown in FIG. 7. (B) in FIG. 8 shows the wheel speed fluctuations ΔVw of the left and right front wheels 4A after being processed by the BPF 72 shown in FIG. 7. (C) in FIG. 8 shows the average value of the absolute values of the left and right wheel speed fluctuations ΔVw outputted from the average value circuit 74 of FIG. 7 and the value obtained by processing this absolute value by the LPF 75 shown in FIG. 7. (D) in FIG. 8 shows the rough road level LR outputted from the rough road level calculation unit 66 shown in FIG. 7.

The BPF 72 extracts the component of the wheel speed fluctuation ΔVw of each front wheel 4A shown in (A) of FIG. 8 that is within a relevant frequency range. This frequency component represents the road input, and the average of the absolute values of the left and right amplitudes shown in (C) of FIG. 8 indicates the magnitude of the input. Then, the smoothed value indicates a measure of the uneven state or the roughness of the traveling road of the vehicle 1. The uneven state of the traveling road varies depending on the vehicle speed V, and the rough road level LR of the traveling road is calculated by multiplying this value by the rough road level base value LRb set according to the vehicle speed V.

Referring to FIG. 7 once again, the slip ratio calculation unit 67 executes a slip ratio calculation process for calculating the slip ratio S based on the vehicle speed V, the yaw rate r, and the wheel speeds Vw of the rear wheels 4B. The details of the slip ratio calculation process will be described hereinafter.

In the slip ratio calculation unit 67, a rear wheel speed correction unit 79 corrects the wheel speeds Vw of the rear wheels 4B based on the yaw rate r. More specifically, the rear wheel speed correction unit 79 calculates the turning radii at the center of the front wheel axle and the center of the rear wheel axle, and based on the tread, the turning radii of the left and right front wheels 4A and the turning radii of the left and right rear wheels 4B, respectively, are calculated. The rear wheel speed correction unit 79 then corrects the wheel speeds Vw of the right and left rear wheels 4B according to the calculated turning radii so as to compensate for the difference between the front wheels and the rear wheels 4B due to the turning radius differences.

A front/rear wheel speed difference calculation unit 80 calculates the front/rear wheel speed difference by subtracting the wheel speed Vw of the rear wheel 4B from the wheel speed Vw of the front wheel 4A for each of the front and rear wheel pairs. Each front/rear wheel speed difference is converted into a value that does not contain the road surface input component by being filtered by an LPF 81 (low-pass filter). The front/rear wheel speed differences for the front and rear wheel pairs after the filtering process are inputted to a divider 82 each as a numerator. The vehicle speed V is inputted to the divider 82 as a denominator. The divider 82 thus calculates the front/rear wheel speed difference ratio for each of the front and rear wheel pairs by dividing the corresponding front/rear wheel speed difference by the vehicle speed V.

The left and right front/rear wheel speed difference ratios are converted into absolute values by an absolute value calculation circuit 83, and are outputted as the left and right slip ratios S of the vehicle 1. The left and right slip ratios S outputted from the absolute value calculation circuit 83 are inputted to a high value selection circuit 84 which outputs the higher value of the two inputs as the slip ratio S of the vehicle 1.

Figure 9:
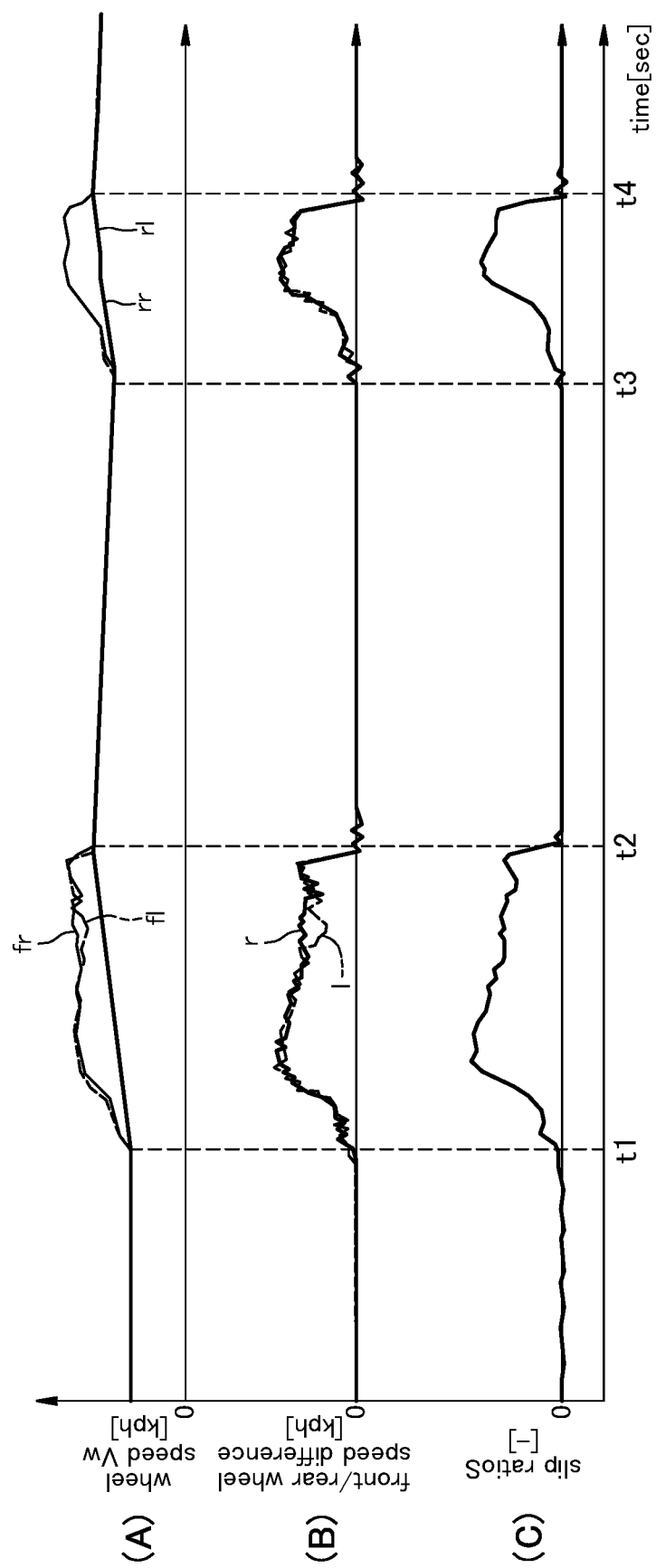
FIG. 9 is a time chart showing the changes in various variables in a slip ratio calculation process.

FIG. 9 is a time chart showing changes of various parameters in the slip ratio calculation process. (A) in FIG. 9 shows the wheel speeds Vw of the four wheels 4A. (B) in FIG. 9 shows the left and right front/rear wheel speed differences outputted from the front/rear wheel speed difference calculation unit 80 shown in FIG. 7. In this time chart, "fr" denotes the right front wheel 4A, "fl" the left front wheel 4A, "rr" the right rear wheel 4B, and "rl" the left rear wheel 4B. (C) in FIG. 9 shows the slip ratio S outputted from the slip ratio calculation unit 67 shown in FIG. 7.

In this example, the vehicle 1 is accelerating during the time interval between the time point t1 and the time point t2, and the time interval between the time point t3 and the time point t4. As shown in (A) of FIG. 9, the wheel speeds Vw of the front wheels 4A, which are the driven wheels, are significantly greater than the wheel speeds Vw of the rear wheels 4B when the vehicle 1 is accelerating. Therefore, as shown in (B) of FIG. 9, the difference in speed between the front wheel 4A and the rear wheel 4B on each side is significantly large in value in these time intervals. The slip ratio S outputted from the slip ratio calculation unit 67 is the larger of the left and right slip ratios S, and substantially corresponds to the right slip ratio S during the time interval between the time point t1 and the time point t2.

Figure 10:
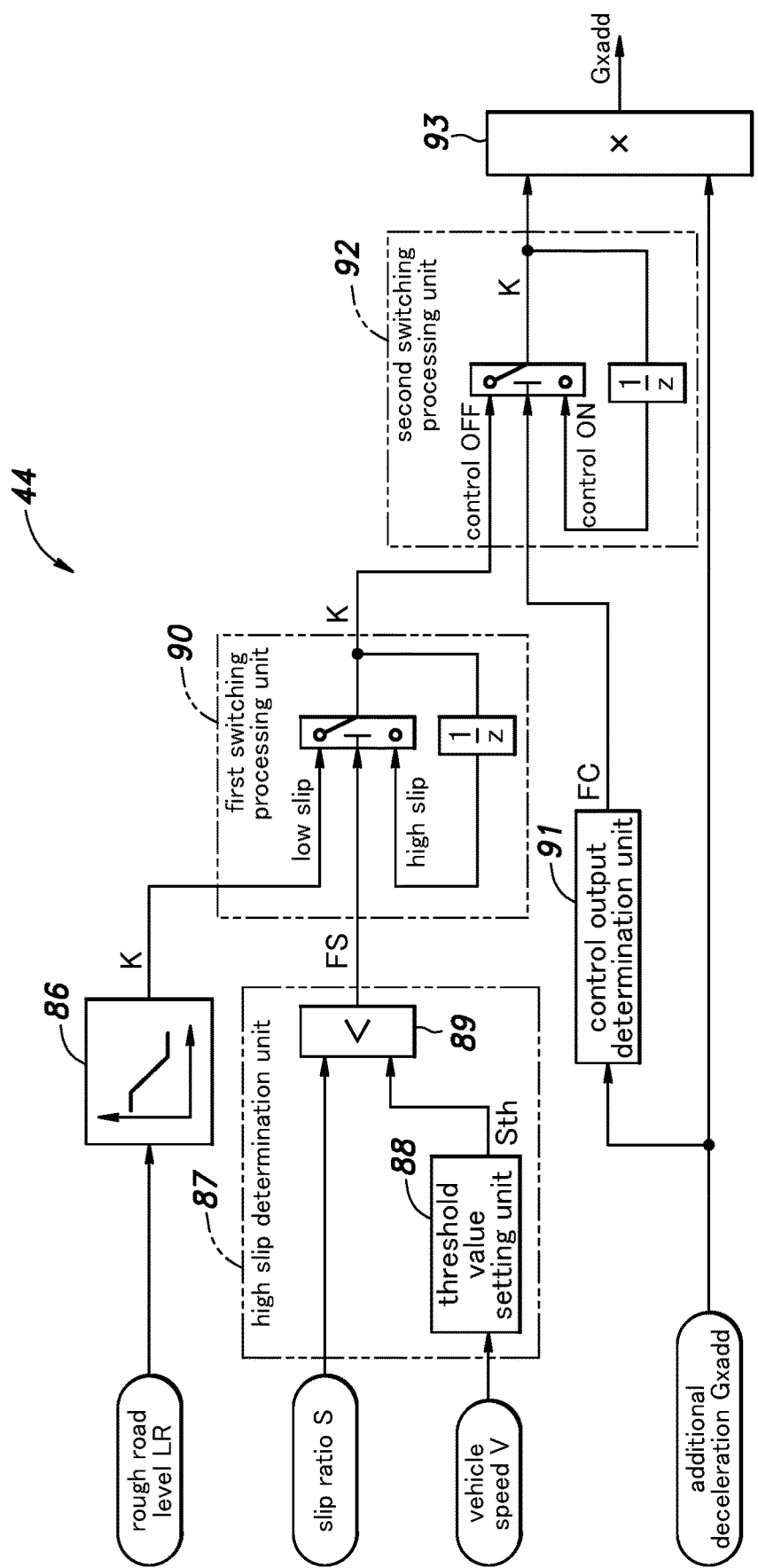
FIG. 10 is a functional block diagram of an additional deceleration correction unit.

FIG. 10 is a functional block diagram of the additional deceleration correction unit 44. The additional deceleration correction unit 44 executes an additional deceleration correction process for correcting the additional deceleration Gxadd based on the rough road level LR, the slip ratio S, and the vehicle speed V. The functions of the additional deceleration correction unit 44 that executes the additional deceleration correction process will be described in the following with reference to the FIG. 10.

The additional deceleration correction unit 44 includes a correction coefficient setting unit 86, a high slip determination unit 87, a first switching processing unit 90, a control output determination unit 91, a second switching processing unit 92, and a correction unit 93.

Figure 11:
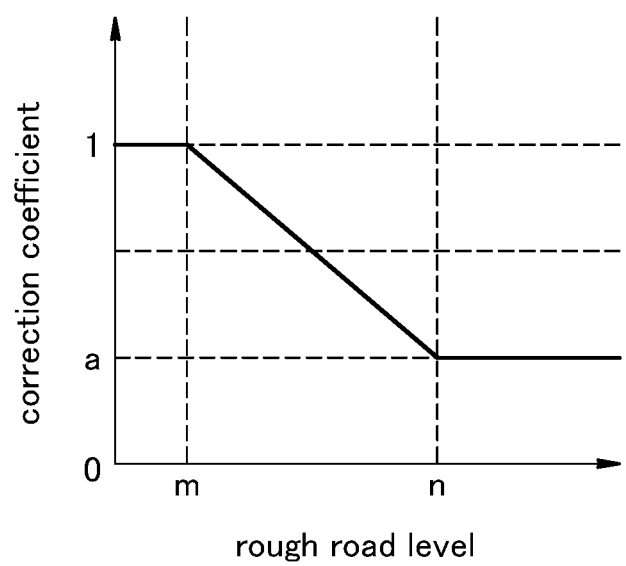
FIG. 11 is an example of a correction coefficient map.

The correction coefficient setting unit 86 calculates a correction coefficient K for the additional deceleration Gxadd based on the rough road level LR. Since the additional braking force Fbadd is calculated based on the additional deceleration Gxadd, the correction coefficient K corresponds to the amount of correction for the additional braking force Fbadd. The correction coefficient setting unit 86 contains a correction coefficient map that outputs a value for the correction coefficient K corresponding to the rough road level LR. The correction coefficient map may be defined as shown in FIG. 11, for example. In this example, when the rough road level LR is equal to or less than a first value m, the correction coefficient K is set to 1. When the rough road level LR is equal to or greater than the second value n larger than the first value m, the correction coefficient K is set to a predetermined value a smaller than 1 and larger than 0. When the rough road level LR is larger than the first value m and smaller than the second value n, the correction coefficient K is obtained as a value which progressively decreases as the rough road level LR gets higher from 1 to a. In this particular embodiment, the correction coefficient K linearly decreases from 1 to a as the rough road level LR rises from m to n.

Referring to FIG. 10 once again, the high slip determination unit 87 includes a threshold value setting unit 88 and a determination unit 89. The threshold value setting unit 88 sets the threshold value Sth for the slip ratio S for determining a state of high slip based on the vehicle speed V. The threshold value setting unit 88 sets the threshold value Sth so that, for example, the higher the vehicle speed V is, the larger the threshold value Sth becomes. The determination unit 89 determines if the slip ratio S is larger than the threshold value Sth or not, and if the slip ratio S is larger than the threshold value Sth, the slip flag FS is set to 1 to indicate a state of high slip. When the slip ratio S is equal to or less than the threshold value Sth, the slip flag FS is set to 0 to indicate a state of low slip.

The correction coefficient K set by the correction coefficient setting unit 86 and the slip flag FS are inputted to the first switching processing unit 90. Based on the slip flag FS, the first switching processing unit 90 switches the output correction coefficient K between the correction coefficient K set by the correction coefficient setting unit 86 and a previous value of the output correction coefficient K. More specifically, when the slip flag FS is 0 indicating the state of low slip, the first switching processing unit 90 outputs the correction coefficient K set by the correction coefficient setting unit 86, and when the slip flag FS is 1 indicating the state of high slip, the previous value of the correction coefficient K is outputted. The reason for employing the first switching processing unit 90 to perform this switching process is to prevent an improperly calculated correction coefficient K from being outputted due to the failure for the rough road level LR to be properly calculated by the rough road level calculation unit 66 in the state of high slip.

Figure 12:
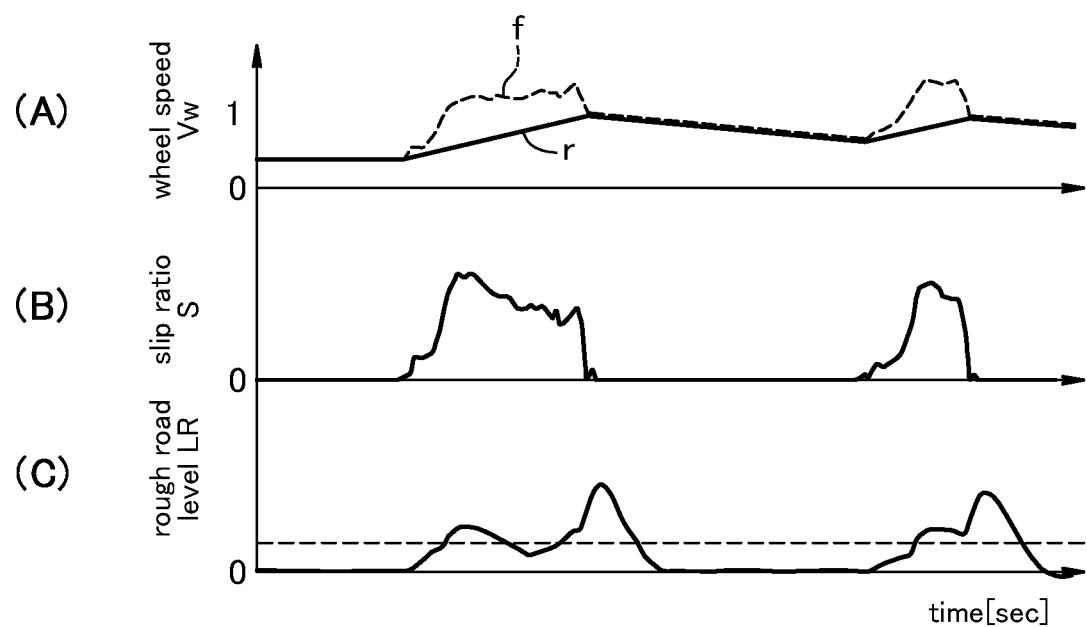
FIG. 12 is a time chart showing a calculation example of a rough road level.

FIG. 12 is a time chart showing changes in the various variables in an example of calculating the rough road level LR. In the example shown in FIG. 12, when the vehicle 1 is accelerating, the front wheels 4A, which are the driven wheels, slip so that the wheel speed Vw of the front wheels 4A (indicated by "f" in the time chart) is higher than the wheel speed Vw of the rear wheels 4B (indicated by "r" in the time chart). During these time intervals (in which the vehicle 1 is accelerating), the slip ratio S naturally becomes large, and the rough road level LR is also calculated as a large value. The increase in the rough road level LR during this period is not due to the change in the road surface condition, but due to the slipping of the front wheels 4A. Therefore, at this time, the rough road level LR does not correctly represent the actual road surface condition. Therefore, when the first switching processing unit 90 in FIG. 10 determines the state of high slip, the previously outputted correction coefficient K (previous value) is outputted, and the rough road level LR is maintained at the value which was originally obtained prior to the initiation of the state of high slip.

Here, as soon as the difference between the front and rear wheel speeds Vw disappears, the slip ratio S returns to the original value (approximately 0). On the other hand, it takes some time for the rough road level LR to return to the original value (substantially 0) after the slip ratio S has returned to about 0. Therefore, the first switching processing unit 90 in FIG. 10 performs the switching process whereby the previous value of the correction coefficient K is outputted for a predetermined time period after the slip ratio S has become equal to or less than the threshold value Sth (after the slip flag FS has changed from 1 to 0), and once a predetermined time period has elapsed thereafter, the correction coefficient K set by the correction coefficient setting unit 86 is outputted.

The control output determination unit 91 determines if the additional deceleration control for adding the additional deceleration Gxadd to the vehicle 1 is being executed based on the additional deceleration Gxadd, or in other words, if the additional braking force Fbadd (control amount) which is calculated based on the additional deceleration Gxadd is being requested. More specifically, when the additional deceleration Gxadd is 0, the control output determination unit 91 determines that the additional braking force Fbadd is not requested, and sets a control request flag FC to 0. When the additional deceleration Gxadd is smaller than 0 (negative value), the control output determination unit 91 determines that the additional braking force Fbadd is requested, and sets the control request flag FC to 1.

The correction coefficient K outputted from the first switching processing unit 90 and the control request flag FC are inputted to the second switching processing unit 92. Based on the control request flag FC, the second switching processing unit 92 switches the output correction coefficient K between the correction coefficient K outputted from the first switching processing unit 90 and the previous value of the output correction coefficient K. More specifically, when the control request flag FC is 0 indicating no control request, the second switching processing unit 92 outputs the correction coefficient K outputted from the first switching processing unit 90. When FC is 1 indicating a control request, the previous value of the correction coefficient K is outputted. The reason for employing the second switching processing unit 92 to perform such a switching process is to prevent the correction coefficient K from changing after the control request flag FC has changed from 0 to 1, or in other words, after the execution of the additional deceleration control has started.

The correction unit 93 corrects the additional deceleration Gxadd by multiplying the additional deceleration Gxadd by the correction coefficient K outputted from the second switching processing unit 92 to output the corrected additional deceleration Gxadd. When the control request flag FC is 0, the correction coefficient K may change, but since the additional deceleration Gxadd is 0, the additional deceleration Gxadd outputted from the correction unit 93 is 0. On the other hand, once the control request flag FC is switched from 0 to 1, the correction coefficient K is fixed while the control request flag FC is 1, and a value (the additional deceleration Gxadd after correction) corresponding to the additional deceleration Gxadd inputted to the additional deceleration correction unit 44 is forwarded from the correction unit 93 to the additional braking force calculation unit 45 (FIG. 2).

Next, the action and effect of the vehicle control system 30 will be discussed in the following.

Figure 13:
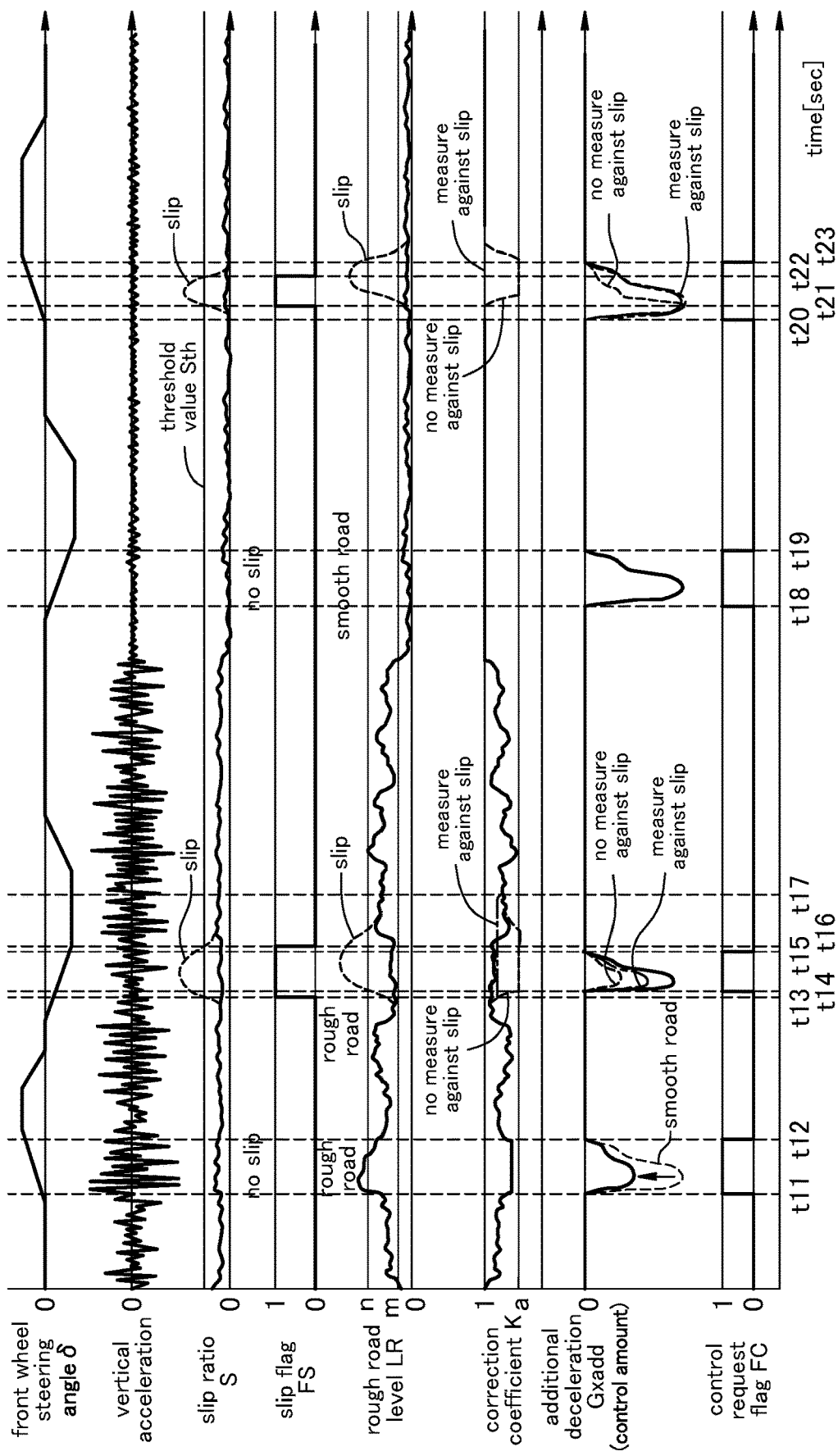
FIG. 13 is a time chart showing the changes in various variables in an additional deceleration correction process.

FIG. 13 is a time chart showing the changes in various variables in the additional deceleration correction process. In the first half (left half) of the time chart, the vehicle 1 travels on a rough road, and experiences significant changes in vertical acceleration. In the second half (right half) of the time chart, the vehicle 1 travels on a smooth road, and experiences small changes in vertical acceleration. When the driver performs a steering operation so as to increase the front wheel steering angle δ from 0 to the right or left, the additional deceleration calculation unit 43 of the control device 31 (FIG. 2) requests the additional deceleration Gxadd which is calculated from the steer drag differential value d/dt GxD. While the additional deceleration calculation unit 43 requests the additional deceleration Gxadd (between the time point t11 and the time point t12, between the time point t14 and the time point t15, between the time point t18 and the time point t19, and between the time point t20 and the time point t23), the control request flag FC is set to 1.

In FIG. 12, the curves representing the slip ratio S and the rough road level LR are shown by solid lines in the case where slip does not occur, and by broken lines in the case where slip is occurring. Further, the curves representing the correction coefficient K and the additional deceleration Gxadd (control amount) are shown by solid lines in the case where slip does not occur, and by broken lines in the case where slip is occurring and no measure (the switching process by the first switching processing unit 90 in FIG. 10) against slip is taken. In the case where slip is occurring, and the measure (the present embodiment) is taken against the slip, the curves representing the correction coefficient K and the additional deceleration Gxadd (control amount) are shown by one-dot chain lines.

First is examined the case where the vehicle is traveling on a smooth road. Between the time point t18 and the time point t19, the additional deceleration Gxadd is requested while the control request flag FC is 1 owing to the steering operation of the driver. The control request flag FC becomes 1 at the time point t20, and the slip ratio S exceeds the threshold value Sth at the time point t21. Then, the slip flag FS becomes 1 and the rough road level LR calculated from the wheel speed fluctuation ΔVw increases. If the control device 31 did not take any measure against slipping, the rough road level LR would become large so that the correction coefficient K is set to a small value (a predetermined value a, which is the minimum value) (see FIG. 11). As a result, the additional deceleration Gxadd is only weakly corrected, and the absolute value thereof would be relatively small.

On the other hand, in the present embodiment, the additional deceleration correction unit 44 takes a measure against slip by maintaining the correction coefficient K at the value (1 in this case) immediately before the slip flag FS became 1. In other words, when the slip ratio S is larger than the threshold value Sth, the additional deceleration correction unit 44 corrects the additional deceleration Gxadd with the previous value of the correction coefficient K. Therefore, an appropriate additional deceleration Gxadd corresponding to the rough road level LR with the same magnitude as when slip did not occur is requested.

When the slip ratio S becomes equal to or less than the threshold value Sth at the time point t22, the slip flag FS becomes 0. On the other hand, the rough road level LR maintains a high value even after the time point t22, but the correction coefficient K is prevented from being suddenly changed at the time point t22 since the additional deceleration correction unit 44 continues to output the previous value of the correction coefficient K for a predetermined time period after the slip flag FS changes from 1 to 0.

Next, a case of a rough road will be discussed. From the time point t11 to the time point t12, the additional deceleration Gxadd is requested while the control request flag FC is 1 owing to the steering operation by the driver. At the time point t11, the slip ratio S is equal to or less than the threshold value Sth, and the slip flag FS is 0. On the other hand, immediately before the time point t11, the rough road level LR is larger than the first value m so that the correction coefficient K is set to a value smaller than 1 (see FIG. 11). When the control request flag FC becomes 1 at the time point t11, the second switching processing unit 92 of the additional deceleration correction unit 44 outputs the previous value of the correction coefficient K, and the correction coefficient K is maintained at the value immediately before the time point t11. The correction coefficient K is maintained at the constant value until the control request flag FC becomes 0.

As a result, as opposed to the additional deceleration Gxadd requested in the case of a good road, the additional deceleration Gxadd which is weakly corrected by the correction coefficient K is requested. As a result, the additional deceleration Gxadd generated in the power plant 6 and/or the brake system 22 is appropriately corrected according to the rough road level LR. Further, when the rough road level LR is high, the additional deceleration correction unit 44 corrects the correction coefficient K so as to weaken the additional deceleration Gxadd so that the ride comfort is prevented from being impaired due to the generation of braking force.

If the correction coefficient K for the additional deceleration Gxadd changes during cornering, the driver may feel a discontinuity in the vehicle behavior during cornering, and may experience some discomfort. In the present embodiment, when the control request flag FC is 1, the additional deceleration correction unit 44 corrects the additional deceleration Gxadd by using the previous value of the correction coefficient K. Therefore, the driver is prevented from feeling any discomfort with the behavior of the vehicle during cornering.

When the slip ratio S increases and exceeds the threshold value Sth at the time point t13, the slip flag FS becomes 1. As the slip ratio S increases, the rough road level LR calculated based on the wheel speed fluctuation ΔVw increases. When the control device 31 does not provide a measure against slip, with the rough road level LR becoming large, the correction coefficient K is set to a small value (predetermined value a, which is the minimum value) (see FIG. 11). As a result, the additional deceleration Gxadd is weakly corrected, and the absolute value thereof becomes very small.

On the other hand, in the present embodiment, the additional deceleration correction unit 44 provides a measure against slip, and maintains the correction coefficient K at the value immediately before the slip flag FS became 1. In other words, when the slip ratio S is larger than the threshold value Sth, the additional deceleration correction unit 44 corrects the additional deceleration Gxadd with the previous value of the correction coefficient K. Therefore, an appropriate additional deceleration Gxadd corresponding to the rough road level LR with the same strength as when slip did not occur is requested.

When the control request flag FC becomes 0 at the time point t15, the additional deceleration Gxadd becomes 0. When the slip ratio S becomes equal to or less than the threshold value Sth at the time point t16, the slip flag FS becomes 0. On the other hand, the rough road level LR maintains a high value even after the time point t15, but after the slip flag FS changes from 1 to 0, the additional deceleration correction unit 44 outputs the previous value of the correction coefficient K for a predetermined time period. Therefore, the correction coefficient K is maintained at a constant value until the time point t17 without abruptly changing at the time point t22.

The present invention has been described in terms of a specific embodiment, but is not limited by such an embodiment, and can be modified in various ways without departing from the scope of the present invention. For example, although in the above embodiment, the additional deceleration correction unit 44 of the control device 31 corrected the additional deceleration Gxadd, and the corrected additional deceleration Gxadd was generated by the power plant 6 and/or the brake system 22, it is also possible to calculate the additional braking force Fbadd based on the additional deceleration Gxadd, and correct the calculated additional braking force Fbadd. Further, in the above embodiment, the additional deceleration correction unit 44 calculated the correction coefficient K based on the rough road level LR, but may also calculate the correction based on the rough road level LR as a value to be added to the additional deceleration Gxadd.

Also, the specific configurations and arrangements of each member or portion, quantity, angle, calculation formula, etc. can be appropriately changed within the scope of the present invention. Further, the components shown in the above embodiments are not entirely indispensable, but can be appropriately selected, omitted and substituted.

The invention claimed is:

1. A vehicle control system, comprising:
a vehicle behavior changing device configured to change a behavior of a vehicle so as to shift a load of the vehicle to a side of front wheels thereof;
a control device that requests a control amount for the vehicle behavior changing device at an initial stage of a cornering maneuver of the vehicle; and
a vehicle state information acquisition device that acquires vehicle state information including a steering angle, and a wheel speed,
wherein the control device includes
an additional deceleration calculation unit that calculates an additional deceleration to be applied to the vehicle based on at least the steering angle,
a target control amount calculation unit that calculates the control amount for the vehicle behavior changing device based on the additional deceleration,
a rough road level calculation unit that calculates a rough road level of a road on which the vehicle travels based on the wheel speed, and
a control amount correction unit that corrects the control amount based on the rough road level,
the rough road level calculation unit being configured to correct the wheel speed so as to remove a change thereof caused by the cornering maneuver of the vehicle, and to calculate the rough road level by using the corrected wheel speed.

2. The vehicle control system according to claim 1, wherein the control amount correction unit is configured to correct the control amount so as to weaken the control amount when the rough road level is high.

3. The vehicle control system according to claim 2, wherein the control device further includes a slip ratio calculation unit that calculates a slip ratio based on the wheel speed,
wherein the control amount correction unit calculates a correction amount for the control amount based on the rough road level, the control amount correction unit correcting the control amount by the calculated correction amount when the slip ratio is in a low slip state where the slip ratio is equal to or less than a predetermined threshold value, and by a previous value of the correction amount when the slip ratio is in a high slip state where the slip ratio is larger than the threshold value.

4. The vehicle control system according to claim 3, wherein the control amount correction unit corrects the control amount by a previous value of the correction amount for a prescribed time period after a start of a low slip state following the high slip state.

5. The vehicle control system according to claim 1, wherein the control amount correction unit calculates the correction amount for the control amount based on the rough road level, determines if the control amount based on the additional deceleration is being requested or not, and in the case where the control amount is being requested, the control amount correction unit corrects the control amount with a previous value of the correction amount.

* * * * *